United States Patent [19]

Luckey

[11] E Patent Number: Re. 31,847

[45] Reissued Date of Patent: Mar. 12, 1985

[54] APPARATUS AND METHOD FOR PRODUCING IMAGES CORRESPONDING TO PATTERNS OF HIGH ENERGY RADIATION

[75] Inventor: George W. Luckey, Rochester, N.Y.

[73] Assignee: Eastman Kodak Company, Rochester, N.Y.

[21] Appl. No.: 558,394

[22] Filed: Dec. 5, 1983

Related U.S. Patent Documents

Reissue of:

[64] Patent No.: 3,859,527
Issued: Jan. 7, 1975
Appl. No.: 320,028
Filed: Jan. 2, 1973

[51] Int. Cl.[3] ..... G03C 5/16

[52] U.S. Cl. ..... 250/327.2; 250/337; 250/484.1

[58] Field of Search ..... 250/327.2, 484.1, 337; 378/99, 171, 58, 59

[56] References Cited

U.S. PATENT DOCUMENTS

| | | | |
|---|---|---|---|
| 2,874,300 | 2/1959 | Van Alphen et al. | 378/171 |
| 2,937,277 | 5/1960 | Euler, Jr. et al. | 378/171 |
| 2,990,473 | 6/1961 | Kallmann . | |
| 3,006,238 | 10/1961 | Eberline . | |
| 3,175,084 | 3/1965 | Hersh | 250/337 |
| 3,359,419 | 12/1967 | Kastner | 250/337 |
| 3,376,416 | 4/1968 | Rutland et al. | 250/337 |
| 3,439,114 | 4/1969 | Taylor | 250/363 |
| 3,479,455 | 11/1969 | Gebel . | |
| 3,518,697 | 6/1970 | Martens | 250/327 X |
| 3,541,245 | 11/1970 | Wilby . | |
| 3,582,651 | 6/1971 | Siedband | 250/394 X |
| 3,622,785 | 11/1971 | Irwin et al. | 250/363 |

FOREIGN PATENT DOCUMENTS 45-34492 11/1970 Japan .

OTHER PUBLICATIONS

"The Reproduction of Colour" by R. W. G. Hunt, pp. 455–464 Fountain Press, London, 1967.

"Principles of Color Reproduction" by J.A.C. Yule, pp. 305–327, John Wiley & Sons, Inc., New York, 1967.

*Primary Examiner*—Alfred E. Smith
*Assistant Examiner*—Carolyn E. Fields
*Attorney, Agent, or Firm*—John D. Husser

[57] ABSTRACT

The disclosure relates to an apparatus and method for recording images on recording mediums which images correspond to high energy radiation patterns. A temporary storage medium, such as an infrared-stimulable phosphor or thermoluminescent material, is exposed to an incident pattern of high energy radiation. A time interval after exposure, a small area beam of long wave length radiation or heat scans the screen to release the stored energy as light. An appropriate sensor receives the light emitted by the screen and produces electrical energy in accordance with the light received. The information carried by the electrical energy is transformed into a recorded image by scanning an information storage medium with a light beam which is intensity modulated in accordance with the electrical energy. Although the invention can be used at any reproduction ratio, it is particularly usable in recording images representative of large format high energy patterns onto microfilm.

65 Claims, 6 Drawing Figures

FIG. 2
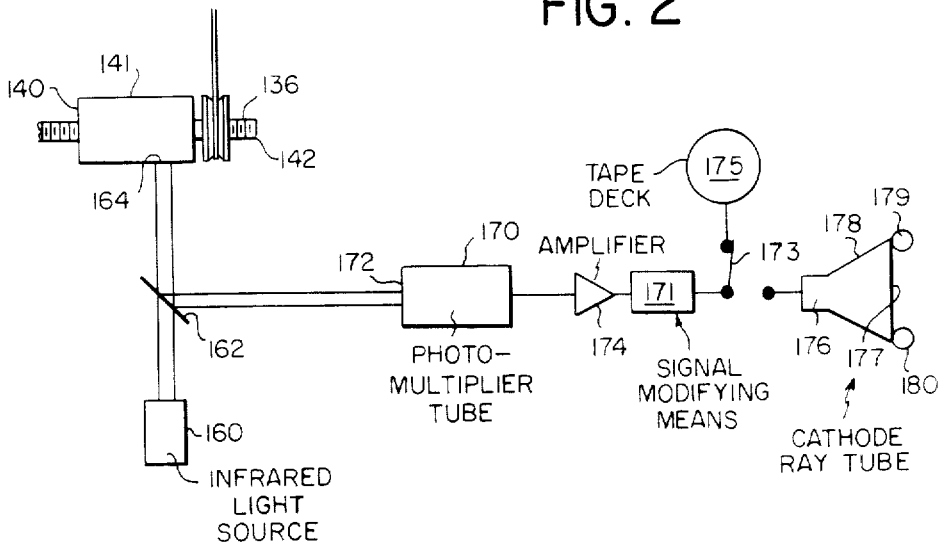
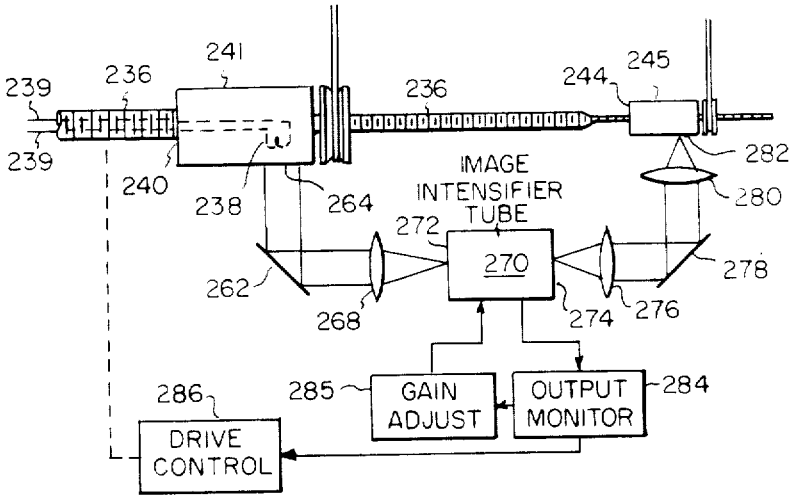
FIG. 3

APPARATUS AND METHOD FOR PRODUCING IMAGES CORRESPONDING TO PATTERNS OF HIGH ENERGY RADIATION

Matter enclosed in heavy brackets [ ] appears in the original patent but forms no part of this reissue specification; matter printed in italics indicates the additions made by reissue.

*This application is a reissue application for U.S. Pat. No. 3,859,527 issued on Jan. 7, 1975 on U.S. Ser. No. 320,028 filed Jan. 2, 1973.*

FIELD OF THE INVENTION

The instant invention relates to a system for radiography and more particularly to an apparatus and method for converting a pattern of high energy radiation into a recorded image using an intermediate energy storing medium.

BACKGROUND OF THE INVENTION

Since x-rays are practically unfocusable with conventional optical apparatus, prior art x-ray devices typically utilize contact printing and do not provide direct image reduction capability. Therefore, a need exists for an apparatus and method which will provide a direct, small format image representative of a large format pattern of high energy radiation without the necessity of a large format radiographic film exposure.

DESCRIPTION OF THE PRIOR ART

Several prior art systems for the storage of an image representative of an incident pattern of high energy radiation exit. U.S. Pat. Nos. 2,482,813 and 2,482,814 to F. Urbach disclose devices for storing images produced by incident ultraviolet light. The stored images are subsequently retrieved by stimulation with red or infrared radiation or by direct heating of the layer. Scanning, as an image readout alternative, is taught in U.S. Pat. No. 2,482,813, whereas U.S. Pat. No. 2,482,814 shows the uniform flooding of a doubly activated phosphor screen with short wavelength radiation. To form an image with the phosphor in printing relation to a photosensitive recording medium, light of a non-exciting wavelength exhausts the excitation of the phosphor in proportion to the intensity distribution of the exposure to record an image on the recording medium.

U.S. Pat. No. 2,482,815, also to F. Urbach, discloses a layer of doubly activated phosphor excited with short wavelength radiation including x-rays and particulate radiation. The excited layer is placed in printing relation to a layer of photosensitive material and stimulated to an image by uniformly distributed infrared light to release the stored energy and expose the photosensitive layer.

Other systems such as that disclosed in U.S. Pat. No. 2,468,452 to H. W. Leverenz utilize stimulable phosphor screens which have the ability to store energy supplied to them directly or indirectly by cathode ray beams. When stimulated, the screens release energy in the form of visible light. Materials such as those disclosed in U.S. Pat. No. 2,468,452 will absorb and store cathode ray energy and give up a portion of this stored energy as visible light when irradiated with infrared light. Hence, phosphors that temporarily store high energy incident radiation patterns for retrieval as visible images an interval of time later by scanning or flooding with non-visible electromagnetic radiation, such as infrared, are known to those skilled in the art.

Another prior art system is shown in U.S. Pat. No. 3,582,651 to Siedband. The device disclosed therein provides for image storage and display. An image intensifier tube converts an incident x-ray pattern into a corresponding electron image. The tube accelerates the electrons toward the output screen of the intensifier. The visible output screen image is optically coupled to a television camera which produces an image for viewing or recording by well known means.

Recorded thermal images called thermograms are obtainable by the prior art method of optically scanning an infrared detector over a field of view to produce electrical signals in accordance with the infrared radiance exhibited by objects in the scanned field of view. The method applies amplified and processed signals from the infrared detector to a glow modulator tube. The tube output scans a light sensitive surface synchronously with the scanning of the field of view to provide the thermogram. Signals from the infrared detector intensity modulate the glow modulator tube to produce a black and white picture in which the point intensities of the picture are related to the infrared radiance of corresponding points in the scanned field of view.

BRIEF SUMMARY OF THE INVENTION

In accordance with the present invention, there is provided an apparatus and method for recording an image representative of an intensity pattern of high energy radiation onto a storage medium. A temporary storage medium, for example, any of certain phosphor screens described below, stores energy from a high energy incident pattern of x-rays or other such high energy electromagnetic or particulate radiation. An infrared or heat source releases the energy stored with the high energy exposure. An appropriate sensing device receives the emitted energy and produces an electrical signal therefrom. The electrical signal which is preferably amplified is converted into an image for recording onto the desired storage medium.

The invention is particularly useful in recording an image representative of a large formal high energy radiation intensity pattern, such as a human chest x-ray, onto a small format recording medium, such as microfilm. The invention is practiced without using the large format x-ray film required by prior art apparatus and methods.

In a preferred embodiment, an infrared or heat source scans the phosphor screen to release the stored energy as intensity modulated light, the scanned out light varying in accordance with the image stored on the screen. A sensor which is synchronizable with the energy releasing scan, such as an image intensifier tube, receives the intensity modulated light and produces electrical energy in the form of a time varying electron emission or electrical signal modulated in accordance with the intensity modulation of the light.

The electrical signal is preferably amplified. The signal can also be otherwise modified to obtain a better image than one obtainable on radiographic film with conventional x-ray contact printing methods. Some possible signal modifications are image intensification, signal-to-noise ratio improvement, and edge-enhancement. Available electrical apparatus afford other image improvements.

After modification, if any, the electrical signal is converted into a time varying modulated light beam which scans a recording medium, such as microfilm, to record an image corresponding to the high energy radition pattern. The image recorded is, in accordance with a preferred embodiment, much smaller than the pattern of high energy radiation it represents.

One object of the invention is to directly provide high quality miniature medical radiographs from the large primary image formats.

Another object of the present invention is to provide a small radiographic image without loss of resolution or loss of speed.

Yet another object of the invention is to realize substantial savings in the cost of making good medical radiographs.

One advantage of the instant invention is that a large input format can be used in combination with a small output format without loss of resolution or loss of speed.

Yet another advantage of the present invention is that in accordance therewith, small, high quality, final images are formed which are not available from typical prior art systems.

Another advantage of the invention is that the practice thereof eliminates the need for large amounts of large format radiographic film by essentially substituting therefor the use of small amounts of microfilm.

BRIEF DESCRIPTION OF THE DRAWINGS

Other objects and advantages of the present invention will be apparent to those skilled in the art from the following description with reference to the drawings in which like characters denote like parts and wherein:

FIG. 2 is a schematic representation of another embodiment of the invention wherein magnetic tape or a CRT and photosensitive recording film can be used as small format output devices;

FIG. 3 is a schematic showing of the scanner of the invention employing a heat spot in thermal contact with the temporary storage medium;

DESCRIPTION OF THE PREFERRED EMBODIMENTS

As used herein, "light" includes electromagnetic radiation in the visible, infrared, and ultraviolet portions of the spectrum. "High energy radiation" includes x-rays, gamma rays, alpha rays, beta rays, high energy neutrons and other similar forms of "hard" or penetrating electromagnetic or particulate radiation.

The embodiments of the invention to be described incorporate temporary image storage mediums that preferably comprise phosphors. Useful phosphors will store an image representative of a pattern of radiation within a first wavelength range, such as x-radiation, for a desired period of time and emit light representative of the image stored when irradiated with radiation within a second wavelength range, such as the infrared.

The image retention time period desired will vary from less than a second to a few minutes, or even a few hours, days or weeks, and will depend on the embodiment of the invention to be used. In any case, the phosphor selected for a particular embodiment should satisfactorily retain an image of the high energy radiation pattern for the desired length of time. Although not necessary, it is highly desirable for the phosphor to be readily reusable. Therefore, it is preferable that the phosphors not retain significant image traces after readout. Alternatively, the phosphor could be reducible to a neutral state by simple expedients such as brief, uniform illumination, irradiation, or heating.

Phosphors transparent to their own emitted radiation are particularly advantageous. Such phosphors include SrS:Ce,Sm;SrS:Eu,Sm; $ThO_2$:$E_r$; and $La_2O_2S$:Eu,Sm; in hot pressed or fused crystal form. The SrS:Ce,Sm; screen is insensitive to tungsten illumination. It can therefore be easily handled under room light conditions. Ultraviolet-sensitive phosphors can be used under fluorescent lighting if coated with an ultraviolet filter layer. Phosphors sensitive to other portions of the visible spectrum can be similarly filter coated.

Although hot pressed and fused crystal phosphors are preferred, the temporary storage medium may comprise thermoluminescent, radiochromic, radiophotoluminescent or infrared-stimulable phosphors in the form of unitary crystals or small crystals dispersed in an appropriate binder. It will be apparent to those skilled in the art that other temporary storage mediums such as photoconductor-panels or field effect semiconductor-electroluminescent panels can also be used. In choosing a temporary medium, the primary criterion is that a stored image must be efficiently releasable as emitted energy with the application of low energy radiation such as infrared light, heat, long wavelength visible light, or an electric current.

Figure 1:
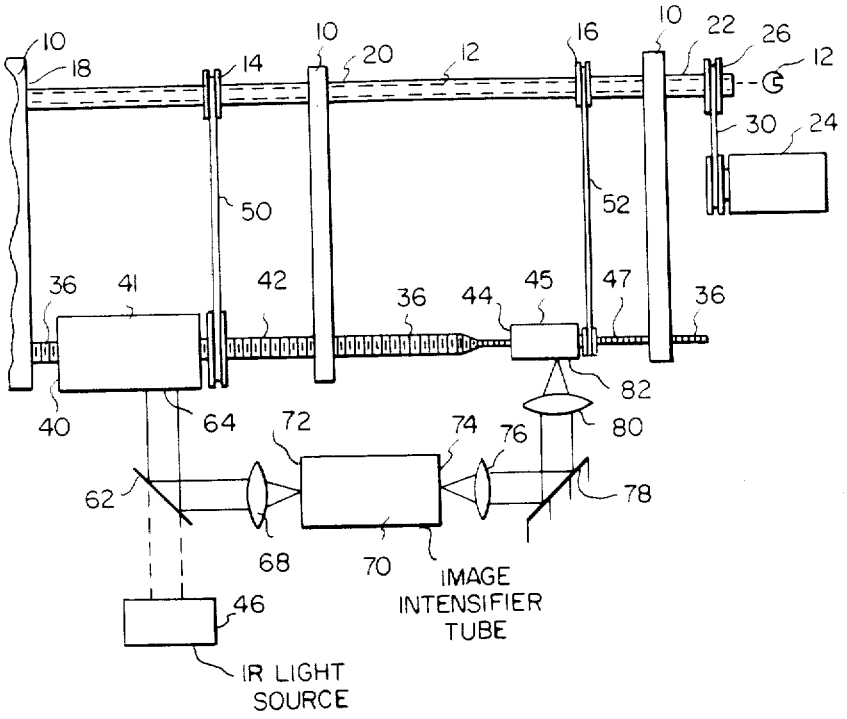
FIG. 1 is a schematic diagram illustrating a scanning apparatus for use in accordance with the invention.

Reference is now made to FIG. 1. A frame 10 retains two rotatable shafts, 12 and 36, in parallel relationship. The shafts rotate freely within bearings (not shown) located in the frame.

Two drums, 40 and 44, are rotatably mounted on shaft 36. A temporary storage medium 41 as heretofore described is mounted on drum 40. A light responsive recording medium 45, such as microfilm, is mounted on drum 44. Pulleys 14 and 16 drive belts 50 and 52 to simultaneously rotate drums 40 and 44 at the same rotational velocity.

Shaft 36 has two sets of threads, 42 and 47. Drum 40 engages threads 42 whereas drum 44 engages threads 47. The ratio of the relative spacing of threads 42 and 47 is fixed. The ratio can be, for example 1:4 so that for every revolution of the drums, drum 40 moves laterally four times as far as drum 44. For a distortion free reproduction of the image to be recorded on medium 45 from medium 41, the ratio of the thread spacing should be the same as the ratio of the circumference of medium wrapped drum 40 to the circumference of the medium wrapped drum 44. Of course, image elongation in either direction may be desired and thread spacing or drum diameter ratios may be changed to accommodate a particular format.

As they rotate, pulleys 14 and 16, keyed to shaft 12, freely move laterally along shaft 12 to retain alignment with their respective drums. A motor 24 drives shaft 12 by a pulley 26 and belt 30 arrangement. Pulley ratios and motor speed are selected to supply a desired rotational speed for the drums 40 and 44.

Source 46 directs a beam of infrared light through an interference filter 62 onto an area 64 of infrared stimulable medium 41. If an image is stored thereon, the phosphor of the medium emits light in response to the stimulation. The emitted light is preferably visible light, but may be ultraviolet or infrared light. Light emitted from medium 41 in response to stimulation reflects from interference filter 62 through a lens 68 onto the input face 72 of an image intensifier tube 70. In response to the light, the photocathode within the image intensifier tube creates electrical energy in accordance with the intensity of the light impinging on input face 72. The electrical energy of this embodiment is in the form of an electron emission. Electron optics within the tube accelerate the electrons emitted by input photocathode 72 to produce an intensified image on an output phosphor 74. The light emitted by phosphor 74 passes through a lens 76 onto a mirror 78. Mirror 78 reflects the light through a lens 80 which focuses the light to an image on an area 82 of recording medium 45. Area 82 corresponds to area 64 on phosphor 41 so that as the scanner is operated, an image of reduced size corresponding on a point basis with the image from phosphor 41 is recorded on microfilm 45.

Because magnetic intensifier tubes, particularly large format tubes, rotate the image intensified up to about 3°, an image rotator such as a prism can be included in the optics of the apparatus to compensate for the rotation. No image rotator is shown in FIG. 1 for the sake of clarity. Also, depending on the image intensifier tube utilized, image reorientation is carried out by optics known to those skilled in the art, such as an AMICI prism, or pentaprism or fiber optics.

An arrangement which can take the place in FIG. 1 of the infrared source 46, dichroic mirror 62, and lens assembly 68, is similar to that described by Ball et al, Third Symposium on Photoelectronic Image Devices, London 1965, Advances in Electronic Series, pp. 927–940. The assembly comprises a right angle prism, No. 60649A obtained from the Edmond Scientific Company, disposed between two f/2.8, 5 inch focal length Kodak Projection EKTANAR lenses. A "hot mirror" interference filter is placed between the first lens and drum 40. A mask having a rectangular aperture 0.480 inch wide and ½ cm. high is located very close to the drum 40 between the filter 62 and the drum 40. A Varo Model 8606 intensifier tube is used. A piece of 10mm thick Corning CS4-96 glass is placed just in front of the photocathode of the intensifier tube.

The infrared source is a Kodak Instamatic movie light, containing a 650 watt tungsten lamp and operable at a variable AC potential from a Variac transformer. The infrared source is disposed in front of the hot mirror with 4 mm of Corning CS-2-58 glass and 2.4 mm of Corning CS-7-56 glass between the source and the hot mirror. With this arrangement, radiation from the source reflects from the hot mirror onto the surface of the temporary storage screen. The visible light released from the screen by the infrared radiation passes through the hot mirror and the right angle prism-lens assembly of Ball and is imaged onto the photocathode of the image intensifier tube.

FIG. 2 shows a pulley and belt driven screen drum 140 rotatably mounted on the threads 142 of a shaft 136. Drum 140 holds a temporary storage medium 141 comprising an infrared stimulable phosphor. An interference filter 162 transmits infrared light from an infrared source 160 onto a small area 164 of drum 140. If an image is stored therein, the phosphor of the temporary storage medium 141 emits light at a predetermined wavelength, preferably in the visible part of the spectrum, in response to the infrared light beam incident thereon. Interference filter 162 reflects the emitted light onto the input face 172 of a photomultiplier tube 170. Tube 170 produces electrical energy in the form of an electrical signal modulated in accordance with the intensity of the light incident thereon. The electrical signal is preferably amplified by an amplifier 174, and transmitted to a disconnect switch 173. *As previously described, the signal from amplifier 174 can also be otherwise modified, e.g. by signal modifying means 171, to obtain a better image. Some of the image modifications possible with available electrical apparatus, represented schematically by signal modifying means 171, are image intensification, signal-to-noise ratio improvement and edge-enhancement.* Depending on the position of switch 173, the signal is either recorded onto magnetic tape by well known means such as a tape deck as represented by a block 175 or displayed on the face 177 of a high resolution cathode ray tube 176. The image can be recorded onto microfilm 178 from the display on tube face 177. If recorded onto microfilm 178, conventional supply and take up reels 179 and 180 can be appropriately controlled by conventional means to expose the microfilm in accordance with a particular format.

A direct electron recording film such as one incorporating diynes or polyynes can be used in a tube accommodating the passage of film through itself. Such a tube electrically rather than optically records an image.

A high intensity source of ultraviolet radiation can be modulated in accordance with the light released from the phosphor to record an image onto slow non-silver systems such as diazo films, iodoform-sensitized materials, photosensitive polymers and other such substances. An assembly of photomultipliers or photocellamplifiers combinations and recording devices may be also used to receive and record the phosphor output. A low light level television system can be utilized to amplify, display, and record light emitted from the stimulated phosphor. Combinations of an image intensifier tube with a silicon intensifier target tube (SIT) described by R. W. Engstrom and R. L. Rodgers in Optical Spectrum 5, pp. 26–31 (1971) are particularly suitable. A small format representation of the phosphor output can also be electrostatically recorded with an electrical discharge tube such as the "Printapix" tube, a trademark of Litton Industries, Inc.

FIG. 3 illustrates another embodiment of the invention. A hollow, transparent, screen drum 240 rotatably mounted on threaded shaft 236 carries a thermoluminescent phosphor temporary storage medium 241. Threaded shaft 236 supports a heat source 238. An electric current carried to the source by wires 239, which run through the tubular threaded shaft 236, activates heat source 238. Shaft 236 threadably engages a recording drum 244 holding a recording medium, such as microfilm 245. Drums 240 and 244 are driven so that they rotate at the same angular velocity. The threads and the circumferences of the drums have a fixed ratio to one another as in the FIG. 1 embodiment.

If the phosphor of medium 241 contains an image of a pattern of high energy radiation, it emits light from an area 264 when thermally stimulated by source 238. The light is preferably visible light but may be ultraviolet or infrared. A mirror 262 deflects the emitted light through a lens 268 onto the face 272 of an image intensifier tube 270. The tube 270 receives the light, converts it into electrical energy in the form of electrons, accelerates the electrons, and creates an intensified light pattern therefrom on its output face 274. Light from the output face 274 passes through a collimating lens 276 onto a mirror 278 which deflects the light beam through another lens 280. Lens 280 images the light onto an area 282 of the recording medium 245 on drum 244. Areas 264 and 282 correspond so that as the scanner operates, the microfilm mounted on drum 244 records an image representative of the high energy radiation pattern.

Figure 4:
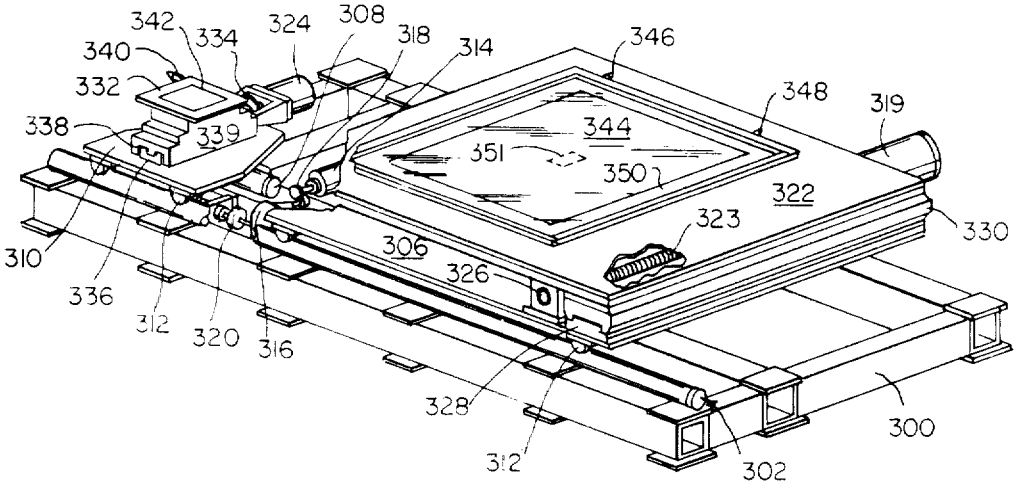
FIG. 4 is a schematic diagram showing an X-Y scanning apparatus for use in accordance with the invention.
Figure 6:
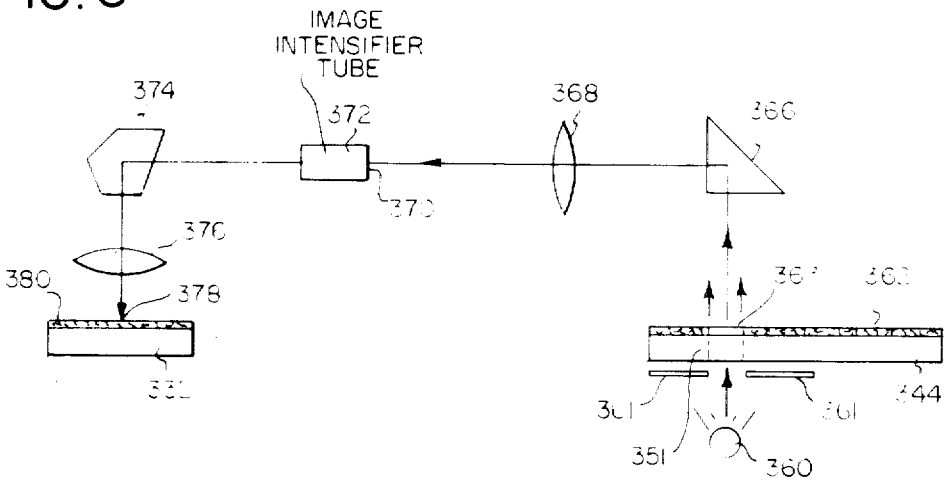
FIG. 6 is a schematic representation of an optical system for use with the scanning apparatus of FIGS. 4 and 5.
Figure 5:
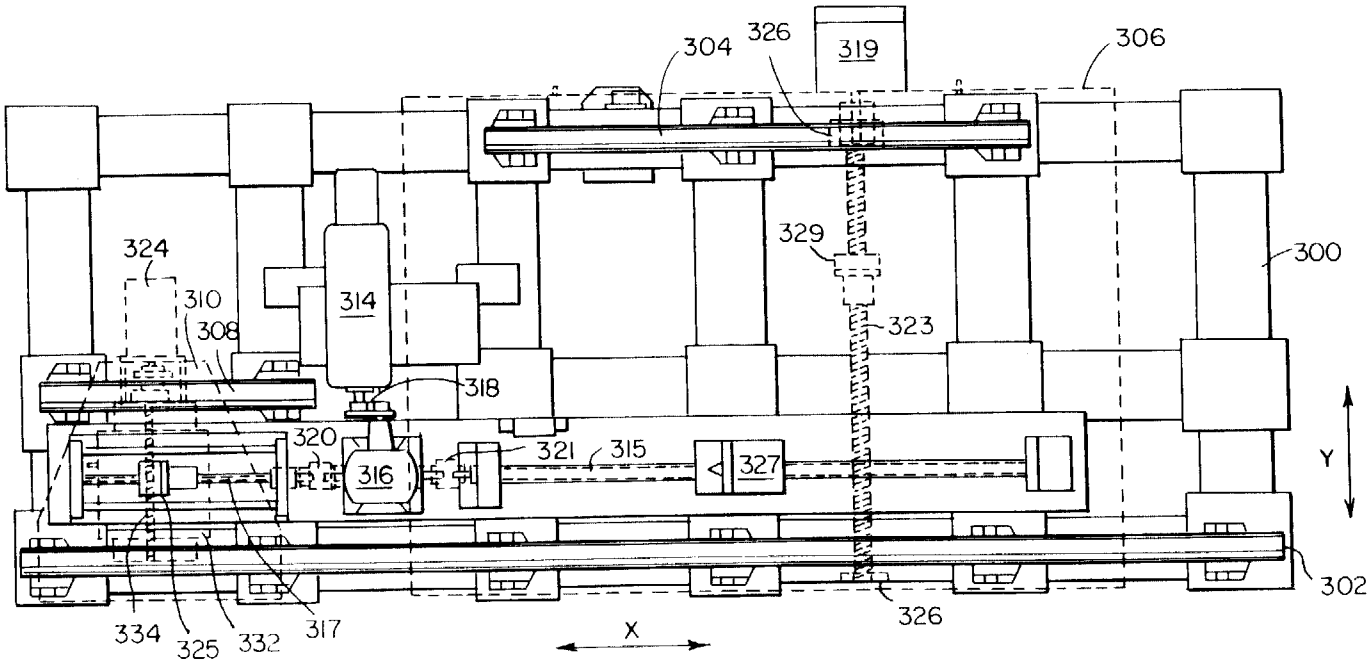
FIG. 5 is another view of the X-Y scanning apparatus of FIG. 4.

FIGS. 4, 5 and 6 show an embodiment of the invention incorporating an X-Y scanner for scanning out information from a large format temporary storage medium and recording it onto a small format storage medium. A sturdy frame 300 supports the scanner. A first carriage 306 rides on tracks 302 and 304 mounted on frame 300. Track 302 and a third track, 308, support a second carriage 310. Tracks 302, 304 and 308 lie parallel in the X-direction, indicated by the double headed arrow labeled X. Carriages 306 and 310 ride on wheels 312 which roll on tracks 302, 304 and 308. The wheels 312 which ride on tracks 304 and 308 cannot be seen in FIGS. 4 and 5. A reversible motor 314 supplies X-directional drive for both carriages by driving a gear box 316 through a friction drive 318. Gear box 316 turns two screw threaded shafts 315 and 317 at the same rotational velocity through couplers 320 and 321. Screw shafts 315 and 317 thread through female receiving units 325 and 327 secured to the bases of carriages 306 and 310 so that as the threaded shafts turn, the carriages 306 and 310 move in the X-direction. The threads on shafts 315 and 317 are related by a fixed ratio so that carriages 306 and 310 move relative to one another in accordance with thread ratio. In the embodiment shown, the ratio is 4:1. Thus, carriage 306 moves four times the distance carriage 310 does for any given number of rotations of the threaded shafts 315 and 317.

Reversible electric motors 319 and 324 implement Y-directional movement as indicated by a double headed arrow Y. Motor 319 drives a platform 322 with a rotatable threaded shaft 323 riding in bearings 326 mounted on carriage 306. A base member 330, secured to platform 322, slides on a track 328 mounted atop carriage 306. Although FIG. 4 only shows one track, another is provided in the cutaway region to provide support to the other side of platform 322. The threaded shaft 323 drives platform 322 by rotating through a threaded female coupler 329 secured to platform 322.

Motor 324 rotating a threaded shaft 334 slides a platform 332 mounted on a base 339 across carriage 310. A groove 338 in base 339 slides on a track 336 secured to carriage 310. Motor 324 is synchronized with motor 319 by well known electrical means (not shown) to move plate 332 in the Y-direction at one fourth or other desired fraction of the speed motor 319 moves plate 322.

Plate 332 is provided with a vacuum connection 340 and a vacuum groove 342 for holding a small format recording medium on plate 332. Plate 322 supports a transparent pane of glass 344 which has a vacuum groove 350 and vacuum connections 346 and 348 for retaining a large format temporary storage medium thereon. Glass plate 344 fits over a removed center portion of plate 322 so that an infrared source can be operated from below the plate. An area 351 outlined with a dotted line represents the output area of the source. The source is kept stationary relative to frame 300 so that an X-Y scan results from operation of the scanner as above described.

FIG. 6 shows an optical system for use with the scanner of FIGS. 4 and 5. The optical system is stationarily supported above the glass plate 344 and plate 332 of the X-Y scanner of FIGS. 4 and 5 by means not shown. An infrared or heat source 360 disposed below mask 361 irradiates area 351 of plate 344 and an area 363 of temporary storage medium 362. The phosphor in irradiated area 363 emits an amount of visible light in accordance with any radiographic exposure thereon. Prism 366 reflects the emitted light through a lens 368 onto the input face 370 of an image intensifier tube 372. The image is electrically intensified by well known means in the tube. The intensified light output from tube 372 passes through a pentaprism 374 to a lens 376. The lens focuses the light onto an area 378 of a small format image recording medium such as microfilm 380. Area 378 on recording medium 380 corresponds to area 363 on phosphor medium 362 so that as the scanner operates, it records a representation of the radiographic image stored on the phosphor onto film 380.

It will be appreciated that alternative X-Y scanning devices and appropriate optical systems will be apparent to those skilled in the art and the invention is not restricted to the embodiment shown in FIGS. 4, 5 and 6.

One scanner installation can service several exposure stations so that a hospital need only have one scanner for several remote x-ray exposure installations. Exposed temporary storage phosphors can be transferred from various x-ray exposure installations to a scanner for recording.

In practicing the invention, there are no screen contact problems as in the contact printing art where x-ray film must intimately contact a phosphor screen in order to obtain a relatively high resolution image on the film. Since in practicing the invention, the phosphor screen does not come in contact with the film as do phosphors and radiographic film in conventional x-ray devices, thick overcoats or glass plates can enclose the screen to protect environmentally sensitive phosphors such as readily oxidizable or hydrophilic phosphors, from deterioration.

In the drum scanner embodiments of FIGS. 1–3, although exposure could be made onto the temporary medium when mounted onto its drum, the temporary storage medium used preferably should be flexible so that one may easily mount and remove the screen from the scanning drum. Too, a high energy radiation exposure is usually carried out with a flattened phosphor screen. After exposure, one mounts the screen on the scanning drum for release of the stored image.

In the X-Y scanner embodiment of FIGS. 4–6, the phosphor screens need not be flexible because exposures and scan outs are made with flat screens. Therefore, screens for use with X-Y scanners can comprise bindless phosphor layers prepared by evaporation, plasma-spraying, hot-pressing, and chemical vapor deposition. Because binderless screens have greater absorption per unit thickness than conventional radiographic screens, they offer the advantage of greater radiographic speed with retention of image quality.

Phosphors used in accordance with the invention should preferably have good storage efficiency at room temperature. However, losses of stored information by thermal decay or other phenomena are somewhat compensatable by scanning an area of the phosphor which has received a standard exposure, monitoring the image intensifier output, *e.g. by output monitor circuit 284 (see FIG. 3)*, and adjusting the gain of the intensifier, *e.g. by gain adjustment circuit 285*, or the rate of scanning, *e.g. by drive control 286*, to produce an increased level of brightness. Phosphors which have high emission efficiency when stimulated are desirable because less expensive image amplification and optical equipment can be used with them.

In one embodiment, an infrared beam or heat source scans an appropriate temporary storage medium to release trapped carrier electrons. The electrons are collected to form an electrical signal which is amplified. The information carried by the signal is displayed on a cathode ray tube or recorded onto a small format image recording medium.

An appropriate sensor receives the intensity modulated light from the temporary image storage medium. Since, in a preferred embodiment, the stored high energy radiation image is scanned from the temporary storage medium, a sensor synchronizable with the scanning apparatus should be employed. Suitable sensors include photomultiplier tubes, photocell amplifier combinations, image intensifier tubes and low light level television camera tubes such as image isocon or the silicon intensifier target tube. Channel electron multipliers with appropriate photocathodes and output screens and other high gain, low noise detectors can also be used.

In practicing the invention, one may use a high gain image intensifier, such as the Varo intensifier, which has a minimum gain of about 35000 or the E.M.I. 9694 Image Intensifier Assembly which has a minimum gain of 1,000,000, with minimal optical distortion of the image. High gain and low distortion are advantageous, because they permit the use of less efficient storage phosphors and faster scanning rates. Fast scanning rates permit one scanner to serve several exposure installations with a consequent decrease in the cost per exposure. The use of intensifiers with fast decay output phosphors is advantageous, because it prevents blurring of the image and loss of sharpness.

An image intensifier based on the Bendix Chevron CEMA Model BX3040 can also be used.

The electrooptical amplification achieved in practicing the invention provides for the use of relatively slow image recording films which are rapidly processable with simple equipment.

Microfilm is the preferred recording medium because it is readily available and inexpensive. However, other materials suitable for recording the final images include diazo film, polyyne, photosensitive polymer layers, iodoformsensitized film, di-yne coatings, magnetic tape, embossed tape, and electrographic layers.

The invention has been described in detail with particular reference to preferred embodiments thereof, but it will be understood that variations and modifications can be effected within the spirit and scope of the invention.

I claim:

1. An apparatus for producing an image corresponding to [a] *an incident x-ray image* pattern [of radiation of a first wavelength], using a medium [for] releasably storing an *energy* image *pattern* representative of [the] *such incident x-ray image* pattern, said apparatus comprising:

means for [applying a second wavelength of radiation to] *scanning successive sub-areas of* said image storage medium *with a beam of low energy radiation of a second wavelength* to cause [said] *respective* storage medium *sub-areas sequentially* to [emit a third wavelength of] *release the stored energy in the form of sequential, photoelectrically detectable* radiation [having] *emissions of a third wavelength which constitute* an intensity pattern representative of the stored image;

means for *sequentially* sensing the third wavelength radiation *emissions* and for producing *an* electrical [energy in accordance therewith] *signal representative of the incident x-ray image pattern*; and means for converting the electrical [energy] *signal* into an image corresponding to the [pattern of first wavelength radiation] *x-ray image.*

2. The invention of claim 1 wherein said converting means comprises means for recording an image smaller than the *x-ray image* pattern [of first wavelength radiation].

3. An apparatus, using a medium [for] releasably storing an *energy* image *pattern* representative of [a] *an incident x-ray image* pattern, [of radiation of a first wavelength] for producing an image corresponding to the pattern on a recording medium, said apparatus comprising:

means for scanning said storage medium with a [second wavelength of] *beam of low energy* radiation *of a second wavelength* to release [therefrom], *sequentially from successive scanned medium portions,* [a third wavelength of] *photo-detectable* radiation *emissions of a third wavelength and* intensity [modulated] in accordance with the stored image *pattern;* means synchronized with said scanning means for *photoelectrically* sensing the *sequentially* released third wavelength radiation *emissions* and for producing *an* electrical [energy] *signal* representative [thereof] *of the x-ray image pattern*; and means for [transforming] *converting* the electrical energy] *signal* into a recorded image representative of the *x-ray image* pattern.

4. The invention of claim 3 wherein said [transforming] *converting* means comprises:

means for producing a fourth wavelength of radiation intensity modulated in accordance with the electrical energy; and means for recording the representative image on said recording medium with said fourth wavelength radiation.

[5. A method for producing an image corresponding to a releasably stored image of a pattern of high energy radiation, the method comprising the steps of:

releasing the stored image as light energy modulated in accordance with the image;

converting the modulated light energy into corresponding electrical energy;

producing intensity modulated light which varies in accordance with the electrical energy; and recording with the intensity modulated light to form an image corresponding to the pattern of high energy radiation.]

[6. The invention of claim 5 wherein the image recorded is smaller than the high energy radiation pattern.]

7. A method of producing a recorded image corresponding to a releasably stored image of a pattern of high energy radiation, the method comprising the steps of:

releasing the stored image as emitted light on a point by point basis and converting the image into electrical energy modulated in accordance with the point by point intensity of the light emitted;

converting the modulated electrical energy into correspondingly modulated light; and recording an image with said modulated light that represents the high energy radiation pattern on a point by point basis.

8. The invention of claim 7 wherein the image recorded is smaller than the pattern of high energy radiation.

9. The invention of claim 7 wherein the modulated light is scanned to produce the recorded image.

10. An image forming method using an energy storing medium which is characterized by an ability to store [radiant] *x-ray* energy of a first wavelength and release that energy in the form of [detectable] *photodetectable* radiation of a second wavelength when stimulated *by radiant energy of a third wavelength*, said method comprising:

[simultaneously] exposing *the operative portions of* said medium to [a] *respective portions of an x-ray image* pattern of radiation of said first wavelength *to form in said medium a stored energy pattern corresponding to said x-ray image pattern;*

*sequentially* stimulating *successive portions of* said medium to *sequentially* release *stored* energy *in the form of emissions* of said second wavelength *having intensities respectively* corresponding to *portions of* said *stored x-ray energy* pattern;

converting said energy *emissions* of said second wavelength to an electrical signal; and using said electrical signal to control formation of an image corresponding to said [original] pattern of radiation.

11. An image forming method using an intermediate medium capable of storing energy when exposed to x-radiation, which energy is releasable as light when stimulated by infrared radiation, said method comprising:

exposing said medium to a pattern of x-radiation to form a pattern of stored energy in said medium;

scanning said medium with stimulating infrared radiation to release light energy modulated in accordance with said pattern;

converting said light energy to an electrical signal;

using said electrical signal to modulate the intensity of a light beam; and scanning said modulated light beam across a light sensitive recording material to form an image corresponding to said [original] pattern of x-radiation.

12. Apparatus for producing a recorded image corresponding to a pattern of high energy radiation, using a medium having temporarily stored therein an image representative of said pattern as releasable energy, said apparatus comprising:

means for scanning said temporary storage medium to release the stored energy therefrom;

means coordinated with said scanning means for sensing the energy released and for transforming the released energy into electrical energy; and means for converting said electrical energy into an intensified output image corresponding to the pattern of high energy radiation.

13. The invention of claim 12 wherein said medium for temporarily storing an image comprises an infrared-stimulable phosphor screen and said scanning means comprises a source of infrared radiation.

14. The invention of claim 12 wherein said medium for temporarily storing an image comprises a thermoluminescent screen and said scanning means comprises means for scanning said medium with heat concentrated in a small area.

*15. The invention defined in claim 1 or 3 wherein said converting means includes means for modifying said electrical signal to improve the image information thereof.*

*16. The invention defined in claim 15 wherein said modifying means improves the signal to noise ratio of said electrical image signal.*

*17. The invention defined in claim 15 wherein said modifying means processes said electrical signal to provide image edge enhancement.*

*18. The invention defined in claim 15 wherein said modifying means processes said electrical image signal to modify image intensity.*

*19. The invention defined in claim 7 including, prior to the step of converting said electrical energy into recording light, the step of modifying said electrical energy to improve its image information.*

*20. The invention defined in claim 19 wherein the electrical energy is modified to improve signal to noise ratio.*

*21. The invention defined in claim 19 wherein the electrical energy is modified to provide image edge enhancement.*

*22. The invention defined in claim 19 wherein the electrical energy is modified as to image intensity.*

*23. The invention defined in claim 10 or 11 including the step of modifying said electrical signal, prior to its use in formation of a corresponding image, to improve the image information thereof.*

*24. The invention defined in claim 23 wherein said electrical signal is modified to improve signal to noise ratio.*

*25. The invention defined in claim 23 wherein said electrical signal is modified to provide image edge enhancement.*

*26. The invention defined in claim 23 wherein said electrical signal is modified as to image intensity.*

*27. A radiographic imaging system comprising:*

*(a) image storage means having an image zone which is: (i) responsive to an incident x-ray image pattern for producing a corresponding stored energy pattern and (ii) responsive to stimulating radiation for releasing energy so stored as light emissions;*

*(b) means for supporting said image storage means;*

*(c) scanning means for effecting sequential application of such stimulating radiation to successive image zone portions of said image storage means to release energy stored therein as respective sequential light emissions;*

*(d) detector means for optically collecting said sequential light emissions and for producing an electrical signal corresponding to said x-ray image pattern; and*

*(e) means for converting said electrical signal into an image corresponding to said x-ray image pattern.*

*28. Radiographic imaging apparatus constructed to receive and cooperate with a storage means having an image zone which is: (i) responsive to an incident x-ray image pattern for producing a corresponding stored energy pattern and (ii) responsive to stimulating radiation for releasing energy so stored as light emissions, said apparatus comprising:*

*(a) scanning means for sequentially applying such stimulating radiation to successive image zone portions of a received image storage means to release energy stored therein as respective sequential light emissions;*

*(b) detector means for optically collecting said sequential light emissions and for producing an electrical signal corresponding to said x-ray image pattern; and*

(c) means for converting said electrical signal into an image corresponding to said x-ray image pattern.

29. Radiographic imaging apparatus for receiving an image storage medium having an image storage zone which:

(i) has been exposed to the image elements of an x-ray image and stores energy in a pattern corresponding to said x-ray image and (ii) is responsive to stimulating radiation to release stored energy as light emission, said apparatus comprising:

(a) scanning means for sequentially applying such stimulating radiation to successive portions of such a received storage medium to release energy stored therein as respective sequential light emissions;

(b) detector means for optically collecting said sequential light emissions and for producing an electrical signal corresponding to said x-ray image pattern; and (c) means for converting said electrical signal into an image corresponding to said x-ray image pattern.

30. An improved imaging system for medical radiography, said system comprising:

(a) image storage means having an image zone of a format that comprises a plurality of image point portions which: (i) are responsive to respective portions of an incident x-ray image pattern to discretely store corresponding energy pattern portions and (ii) are discretely responsive to stimulating radiation, of lower quantum energy than said x-ray image pattern, to release their stored energy pattern portions as respective emissions of light radiation;

(b) means for supporting said image storage means;

(c) scanning means for discretely providing such stimulating radiation sequentially on successive image point portions of said image zone so as to sequentially release successive light emissions in accordance with the stored energy pattern corresponding to the exposed x-ray pattern;

(d) detector means for sensing the sequential light emissions discretely and for producing, in response thereto, a time-varying electrical signal containing image point information corresponding to said x-ray image pattern; and (e) means for converting said electrical signal into an image corresponding to said x-ray pattern.

31. The system defined in claim 27 or 30, wherein said storage means is constructed to be readily insertable into, and removable from, its operative location relative to said scanning means.

32. The system defined in claim 31 wherein said storage means is flexible.

33. The system defined in claim 27 or 30, wherein said storage means is constructed for facile transfer between a separate operative location at which it is imagewise exposed and said scanning means.

34. An improved medical-radiographic imaging apparatus useful with image storage means having an image zone of a format size which accommodates a medical x-ray image pattern and that comprises a plurality of image point portions which: (i) are responsive to respective portions of such an incident x-ray image pattern to discretely store corresponding energy pattern portions and (ii) are discretely responsive to stimulating radiation, of lower quantum energy than said x-ray image pattern, to release their stored energy pattern portions as respective emissions of light radiation, said apparatus comprising:

(a) scanning means for discretely providing stimulating radiation sequentially on successive image point portions of the image zone of such image storage means so as to sequentially release successive light emissions in accordance with the stored energy pattern corresponding to the exposed x-ray image pattern; and (b) detector means for sensing the sequential light emissions discretely and for producing, in response thereto, a time-varying electrical signal containing image point information corresponding to said x-ray image pattern; and (c) means for converting said electrical signal into an image corresponding to said x-ray pattern.

35. Medical radiographic imaging apparatus constructed to receive and cooperate with image storage means having an image zone that comprises a plurality of image points which: (i) have been exposed to respective portions of an incident x-ray image pattern to discretely store corresponding energy pattern portions and (ii) are discretely responsive to stimulating radiation, of lower quantum energy than said x-ray image pattern, to release their stored energy pattern portions as respective emissions of light radiation, said apparatus comprising:

(a) scanning means for discretely providing stimulating radiation sequentially on successive image point portions of the image zone of a received image storage means so as to sequentially release successive light emissions in accordance with the stored energy pattern corresponding to the exposed x-ray image pattern;

(b) detector means for sensing the sequential light emissions discretely and for producing, in response thereto, a time-varying electrical signal containing image point information corresponding to said x-ray image pattern; and (c) means for converting said electrical signal into an image corresponding to said x-ray pattern.

36. The invention defined in claims 1, 3, 12, 27, 28, 29, 30, 34 or 35 wherein said converting means comprises: (i) means for storing an electrical image signal; (ii) means for receiving an electrical image signal and displaying a visible image corresponding to the information therein and (iii) means for receiving an electrical image signal and recording an image, corresponding to the information therein, on a record medium.

37. The invention defined in claims 1, 3, 12, 27, 28, 29, 30, 34 or 35 wherein said converting means comprises: (i) means for storing an electrical image signal and (ii) means for receiving an electrical image signal and displaying a visible image corresponding to the information therein.

38. The invention in claims 1, 3, 12, 27, 28, 29, 30, 34 or 35 wherein said converting means comprises: (i) means for receiving an electrical image signal and displaying a visible image corresponding to the information therein and (ii) means for receiving an electrical image signal and recording an image, corresponding to the information therein, on a record medium.

39. The invention defined in claims 1, 3, 12, 27, 28, 29, 30, 34 or 35 wherein said converting means comprises: (i) means for storing an electrical image signal and (ii) means for receiving an electrical image signal and recording an image, corresponding to the information therein, on a record medium.

40. The invention defined in claims 1, 3, 12, 27, 28, 29, 30, 34 or 35 wherein said converting means comprises: (i) means for storing an electrical image signal; (ii) means for receiving an electrical image signal and displaying a visible image corresponding to the information therein; (iii) means for imagewise processing such electrical image signal to provide image intensification, improved signal to noise or image edge-enhancement and (iv) means for receiving such

*image signal and recording a modified image pattern on a record medium.*

*41. The invention defined in claims 1, 3, 12, 27, 28, 29, 30, 34 or 35 wherein said converting means comprises: (i) means for storing an electrical image signal; (ii) means for imagewise processing an electrical image signal to provide image intensification, improved signal to noise or image edge-enhancement and (iii) means for receiving such image signal and recording a modified image pattern on a record medium.*

*42. The invention defined in claims 1, 3, 12, 27, 28, 29, 30, 34, or 35 wherein said converting means comprises: (i) means for storing an electrical image signal; (ii) means for receiving an electrical image signal and displaying a visible image corresponding to the information therein and (iii) means for imagewise processing such electrical image signal to provide image intensification, improved signal to noise or image edge-enhancement.*

*43. The invention defined in claims 27, 28, 29, 30, 34 or 35 including means for providing relative movement between said detector means and said image storage means.*

*44. The invention defined in claims 27, 28, 29, 30, 34 or 35 wherein said detector means includes: (i) photoelectric transducer means, (ii) light guide means, located proximate said image storage means, for directing emitted light to said transducer means; and (iii) means for providing relative movement between said light guide means and said image storage means during operation of said scanning means.*

*45. The invention defined in claim 44 wherein the relative movement between said light guide and image storage means is synchronized with said scanning means so that said light guide is sequentially in proximate locations respectively to stimulated point portions of said image storage means.*

*46. The invention defined in claims 27, 28, 29, 30, 34 or 35 wherein said converting means includes means for receiving said electrical image signal and recording an image which corresponds to said exposed x-ray image pattern, but which is reduced in format size relative to said exposed x-ray image pattern.*

*47. The invention defined in claims 27, 28, 29, 30, 34 or 35 wherein said converting means includes means for receiving said electrical image signal and displaying an image which corresponds to said exposed x-ray image pattern, but which is reduced in format size relative to said exposed x-ray image pattern.*

*48. A radiographic imaging method comprising:*

*(a) exposing the image zone of a temporary image storage medium, of the type that is: (i) responsive to an incident x-ray image pattern for producing a corresponding stored energy pattern and (ii) responsive to stimulating radiation for releasing energy so stored as light emissions, to an x-ray image pattern;*

*(b) sequentially applying such stimulating radiation to successive image zone portions of said image storage media to release energy stored therein as respective sequential light emissions;*

*(c) optically collecting and photoelectrically detecting said sequential light emissions to produce an electrical image signal corresponding to said x-ray image pattern; and*

*(d) converting said electrical image signal into an image corresponding to said x-ray image pattern.*

*49. A radiographic imaging method using a storage medium having an image zone that is responsive to an incident x-ray image pattern for producing a corresponding stored energy pattern and is responsive to stimulating radiation for releasing energy so stored as light emissions, said method comprising:*

*(a) exposing the image zone portions of such storage medium to respective portions of an x-ray image pattern;*

*(b) sequentially applying such stimulating radiation to successive image zone portions of said exposed storage medium to release energy stored therein as respective sequential light emissions;*

*(c) optically directing said sequential light emissions to a detector and photoelectrically detecting the emissions to produce an electrical image signal corresponding to said x-ray image pattern; and*

*(d) converting said electrical image signal to an image corresponding to said x-ray image pattern.*

*50. A radiographic imaging method for use with an image storage medium having image storage portions which: (i) have been exposed to an x-ray image and store energy in a pattern corresponding to said x-ray image and (ii) are responsive to stimulating radiation to release stored energy as light emission, said method comprising:*

*(a) sequentially applying such stimulating radiation to successive portions of said storage medium to release energy stored therein as respective sequential light emissions;*

*(b) optically collecting and detecting said sequential light emissions to produce an electrical image signal corresponding to said x-ray image pattern; and*

*(c) converting said electrical image signal into an image corresponding to said x-ray image pattern.*

*51. An improved imaging method for medical radiography, said method comprising:*

*(a) exposing, to an x-ray pattern constituting a medical radiographic image, the plurality of image point portions that comprise the image zone of an image storage medium, and that: (i) are responsive to respective portions of an incident x-ray image pattern to discretely store corresponding energy pattern portions and (ii) are discretely responsive to stimulating radiation, of lower quantum energy than said x-ray image pattern, to release their stored energy pattern portions as respective emissions of light radiation;*

*(b) discretely scanning such stimulating radiation sequentially onto successive image point portions of said storage medium so as to sequentially release successive light emissions in accordance with the stored energy pattern corresponding to the x-ray image pattern;*

*(c) discretely detecting the sequential light emissions and producing, in response thereto, a time-varying electrical image signal containing the image point information corresponding to said x-ray image pattern; and*

*(d) converting said electrical image signal into an image corresponding to said x-ray image pattern.*

*52. An improved medical-radiographic imaging method useful with image storage medium having an image zone that comprises a plurality of image point portions which: (i) are responsive to respective portions of an incident x-ray image pattern to discretely store corresponding energy pattern portions and (ii) are discretely responsive to stimulating radiation, of lower quantum energy than said x-ray image pattern, to release their stored energy pattern portions as respective emissions of light radiation, said method comprising:*

*(a) exposing the image point portions of said storage medium to an x-ray pattern constituting a medical radiographic image;*

*(b) scanning such stimulating radiation sequentially onto successive image point portions of said storage*

*medium so as to sequentially release successive light emissions in accordance with the stored energy pattern corresponding to the x-ray image pattern;*

*(c) detecting the sequential light emissions discretely and sequentially, and photoelectrically producing, in response thereto, an electrical image signal containing the image point information of said x-ray image pattern; and*

*(d) converting said electrical image signal into an image corresponding to said x-ray image pattern.*

*53. The method defined in claims 48, 49, 51 or 52 further including the step of transferring said storage medium between x-ray exposing and scan-stimulating locations after said exposing step.*

*54. A medical radiographic imaging method useful with image storage medium having an image zone that comprises a plurality of image points which: (i) have been exposed to respective portions of an incident x-ray image pattern to discretely store corresponding energy pattern portions and (ii) are discretely responsive to stimulating radiation, of lower quantum energy than said x-ray image pattern, to release their stored energy pattern portions as respective emissions of light radiation, said method comprising:*

*(a) scanning such stimulating radiation sequentially onto successive image point portions of such storage medium so as to sequentially release successive light emissions in accordance with its stored energy pattern;*

*(b) photoelectrically detecting the sequential light emissions discretely so as to produce a time-varying electrical image signal containing image point information corresponding to said x-ray image pattern; and*

*(c) converting said electrical image signal into an image corresponding to said x-ray image pattern.*

*55. The invention defined in claims 48, 49, 50, 51, 52 or 54 wherein said detecting step includes providing relative movement between a photoelectric detector means and said image storage medium.*

*56. The invention defined in claims 48, 49, 50, 51, 52 or 54 wherein said detecting step includes, during said scanning step, relatively moving said storage medium and a light guide which is located proximate said image storage medium for directing light emissions to a photoelectric transducer.*

*57. The invention defined in claim 56 wherein the relative movement between said light guide and image storage means is synchronized with said scanning of stimulating radiation so that said light guide is sequentially in proximate locations respectively to stimulated point portions of said image storage means.*

*58. The method defined in claims 48, 49, 50, 51, 52 or 54 wherein said converting step includes: (i) storing said electrical image signal; (ii) receiving said electrical image signal and displaying a visible image corresponding to the information therein or (iii) receiving said electrical image signal and recording an image corresponding to the information therein on a record medium.*

*59. The method defined in claims 48, 49, 50, 51, 52 or 54 wherein said converting step includes: (i) receiving said electrical image signal and displaying a visible image corresponding to the information therein and (ii) receiving said electrical image signal and recording an image corresponding to the information therein on a record medium.*

*60. The method defined in claims 48, 49, 50, 51, 52 or 54 wherein said converting step includes: imagewise processing said electrical image signal to provide image intensification, improved signal to noise or image edge-enhancement.*

*61. The method defined in claims 48, 49, 50, 51, 52 or 54 wherein said converting step includes: (i) imagewise processing said electrical image signal to provide image intensification, improved signal to noise or image edge-enhancement and (ii) receiving such image signal and recording a modified image on a record medium.*

*62. The method defined in claims 48, 49, 50, 51, 52 or 54 wherein said converting step includes: (i) receiving said electrical image signal and displaying a visible image corresponding to the information therein and (ii) imagewise processing said electrical image signal to provide image intensification, improved signal to noise or image edge-enhancement.*

*63. The method defined in claims 48, 49, 50, 51, 52 or 54 further comprising the steps of monitoring the photoelectrically detected output of a stimulated medium test portion, which has received a test exposure, and adjusting the storage medium's exposures to stimulating radiation in response to such detected output.*

*64. The method defined in claim 63 wherein said adjusting step comprises varying the scan rate of said stimulating radiation in response to such detected output.*

*65. The method defined in claims 48, 49, 50, 51, 52 or 54 further comprising the steps of monitoring the photoelectrically detected output of a stimulated medium test portion, which has received a test exposure, and adjusting the amplification of the electrical image signal in response to such detected test output.*

* * * * *